(No Model.)

L. W. ELLIS.
SHEAF CARRIER.

No. 549,114. Patented Nov. 5, 1895.

Witnesses.
Arthur Johnson
George H. Ellis

Inventor.
Lucien W. Ellis

UNITED STATES PATENT OFFICE.

LUCIEN W. ELLIS, OF ANAMOSA, IOWA, ASSIGNOR TO THE DEERING HARVESTER COMPANY, OF CHICAGO, ILLINOIS.

SHEAF-CARRIER.

SPECIFICATION forming part of Letters Patent No. 549,114, dated November 5, 1895.

Application filed June 7, 1895. Serial No. 552,042. (No model.)

*To all whom it may concern:*

Be it known that I, LUCIEN W. ELLIS, of Anamosa, in the county of Jones and State of Iowa, have invented certain new and useful Improvements in Sheaf-Carriers, of which the following is a description, reference being had to the accompanying drawings, in which—

Figure 2:
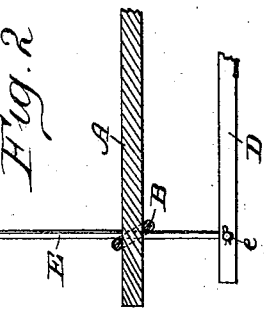
Figure 1:
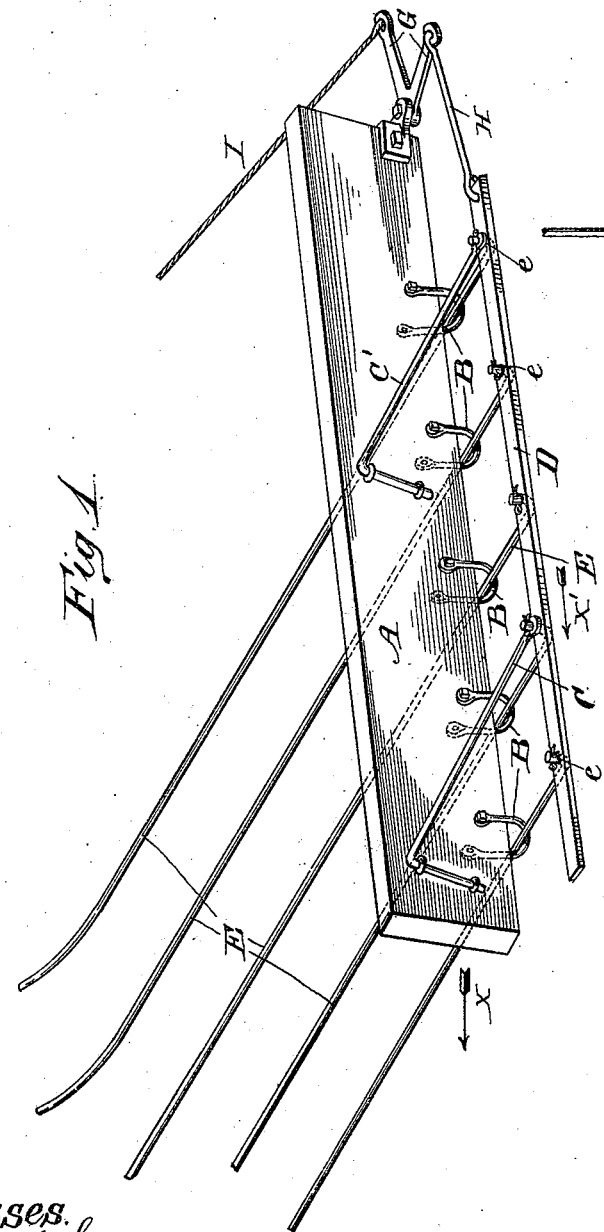

Figure 1 is a perspective view of a sheaf-carrier in which my invention is embodied, and Fig. 2 is a detail.

My invention relates to that class of sheaf-carriers in which the sheaf-supporting fingers project transversely relative to the line of advance of the machine to receive the sheaves and then are permitted to move to a position downwardly, rearwardly, and sidewardly under the weight of the load and trail from beneath it.

In the drawings, A is the finger-supporting bar, provided with stirrups B, and may be considered as suitably supported to a harvester or binder attachment, as the case may be.

C and C' are arms journaled upon diagonal axes on the bar A. They extend inwardly, and at their inward ends are attached by loose joints to a finger-controlling bar D.

Pivoted to holes in the bar D at suitable intervals—in fact at intervals corresponding to the placement of the stirrups B upon the bar A—are a series of fingers E, preferably pivoted by allowing the ends of the fingers when bent as shown in the drawings to pass loosely through the holes c in the finger-controlling bar. Taking into account the fact that the arms C and C' in their movements describe a part of a similar plane the general action of the fingers in discharging will be understood.

The arrow X indicates the line of advance of the machine, and to move the fingers downwardly, rearwardly, and inwardly the finger-controlling bar is moved in the direction of the arrow X'.

To the rear end of the bar A, by any convenient means, is pivoted a bell-crank G, to one arm of which is secured a link H, which extends forwardly and connects the said bell-crank with the finger-controlling bar D. To the other arm of the bell-crank is secured a rope I, which may be considered as extending in any convenient manner to the driver's seat, in order that the sheaf-carrier may be controlled by the driver.

By referring to Fig. 2 it will be seen that the stirrups are so shaped that when the fingers are given their receiving position they strike both sides of the said stirrup, which acts as a stop to prevent the receiving position of the fingers from going too far forward.

What I claim as my invention, and desire to secure by Letters Patent, is—

In a sheaf-carrier, a stationary finger supporting bar, having supports for the fingers in which the latter loosely rest and that serve as axes of movement; a finger controlling bar parallel with the said finger supporting bar and having the grain ends of the supporting fingers loosely pivoted thereto, arms connecting the said finger controlling bar with the finger supporting bar, the said arms pivoted to said bar by diagonal axes, whereby the finger controlling bar is given a longitudinal and an upward movement, thus controlling the swinging movement of the fingers so as to permit their load supporting portions to swing backwardly and downwardly toward the supporting bar and means for moving the finger controlling bar, substantially as described.

LUCIEN W. ELLIS.

Witnesses:
L. SCHOONOVER,
ALLEN T. SANFORD.